(12) United States Patent
Rudell et al.

(10) Patent No.: US 6,325,693 B1
(45) Date of Patent: Dec. 4, 2001

(54) CONTACT ACTIVATED SOUND AND LIGHT GENERATING NOVELTY FOOD CONTAINERS

(75) Inventors: Elliot Rudell, Rancho Palos Verdes; Raymond Fisher, Torrance, both of CA (US)

(73) Assignee: Elliot A. Rudell, Torrance, CA (US)

( * ) Notice: Subject to any disclaimer, the term of this patent is extended or adjusted under 35 U.S.C. 154(b) by 0 days.

(21) Appl. No.: 09/253,180

(22) Filed: Feb. 19, 1999

Related U.S. Application Data

(63) Continuation of application No. 08/626,292, filed on Apr. 1, 1996, now abandoned.

(51) Int. Cl.[7] .......................... A63H 5/00; A63H 29/22; A23G 1/00
(52) U.S. Cl. .......................... 446/81; 446/404; 446/484; 426/104
(58) Field of Search ................. 446/71, 81, 397, 446/404, 484, 491; 206/217; 426/104, 134

(56) References Cited

U.S. PATENT DOCUMENTS

| | | |
|---|---|---|
| D. 260,655 | 9/1981 | Guay . |
| 2,126,858 | 8/1938 | Zadek . |
| 2,663,866 | 12/1953 | Simpson . |
| 2,722,153 | 11/1955 | Greco . |
| 2,787,055 | 4/1957 | Wertz . |
| 2,800,825 | 7/1957 | Guin Y Toussaint . |
| 2,980,039 | 4/1961 | Jolly . |
| 3,510,643 | 5/1970 | File . |
| 3,592,195 | 7/1971 | Van Wagenen . |
| 3,627,161 | 12/1971 | Wergeland . |
| 3,655,325 | 4/1972 | Toppel . |
| 3,818,208 | * 6/1974 | Kahl . |
| 3,839,793 | 10/1974 | Crapio . |
| 4,072,314 | 2/1978 | Rosan et al. . |
| 4,121,835 | 10/1978 | Garabedian . |
| 4,207,673 | 6/1980 | DiGirolamo et al. . |
| 4,252,273 | 2/1981 | Karterman . |
| 4,282,681 | 8/1981 | McCaslin . |
| 4,341,230 | 7/1982 | Siahou . |
| 4,347,683 | 9/1982 | Maxim . |
| 4,383,386 | 5/1983 | Giordano et al. . |
| 4,531,310 | 7/1985 | Acson et al. . |
| 4,631,715 | 12/1986 | Hoover . |
| 4,646,350 | 2/1987 | Batra . |
| 4,765,623 | 8/1988 | Cardillo et al. . |
| 4,779,344 | 10/1988 | Panisch . |
| 4,809,335 | 2/1989 | Rumsey . |
| 4,828,527 | 5/1989 | Spector . |
| 4,840,371 | 6/1989 | Harris . |

FOREIGN PATENT DOCUMENTS

WO 94/17691   8/1994   (WO) .

*Primary Examiner*—D. Neal Muir
(74) *Attorney, Agent, or Firm*—Irell & Manella, LLP

(57) ABSTRACT

A toy that emits a sound when placed into contact with an end user. The toy includes a handle which has a first electrode and a second electrode. The second electrode is in contact with a frozen liquid that is supported by the handle. The electrodes are coupled to a sound generating device which emits a sound when the first electrode is electrically coupled to the second electrode. To operate the toy, the end user grabs the handle and makes contact with the first electrode. The end user then licks the frozen liquid. The body of the end user electrically couples the first electrode with the second electrode so that the sound generating device emits a sound. The electrodes may be coupled to a light bulb that illuminates the frozen liquid when the end user is in contact with the first electrode and licks the frozen item. Alternatively, the light bulb may be activated by depressing a button on the handle.

3 Claims, 2 Drawing Sheets

U.S. PATENT DOCUMENTS

| | | |
|---|---|---|
| 4,914,748 | 4/1990 | Schlotter, IV et al. . |
| 4,936,780 | 6/1990 | Cogliano . |
| 4,941,857 | 7/1990 | Fujimaki . |
| 5,043,704 | 8/1991 | Blakeney . |
| 5,073,140 | 12/1991 | Lebensfeld et al. . |
| 5,075,970 | 12/1991 | Albert . |
| 5,094,644 | 3/1992 | Kelley . |
| 5,203,530 | 4/1993 | Lin . |
| 5,209,692 | 5/1993 | Coleman et al. . |
| 5,228,879 | 7/1993 | Fromm . |
| 5,233,662 | 8/1993 | Christensen . |
| 5,391,107 | 2/1995 | Coleman . |
| 5,536,196 | 7/1996 | Sternberg . |
| 5,722,590 | 3/1998 | Miller . |
| 5,785,406 | 7/1998 | Lee . |
| 5,939,983 * | 8/1999 | Rudell et al. .................. 340/540 |
| 6,054,156 * | 4/2000 | Rudell et al. .................. 426/104 |
| 6,062,936 * | 5/2000 | Rudell et al. .................. 446/71 |
| 6,129,292 * | 10/2000 | Leung et al. .................. 439/33 |

* cited by examiner

CONTACT ACTIVATED SOUND AND LIGHT GENERATING NOVELTY FOOD CONTAINERS

CROSS REFERENCE TO RELATED APPLICATIONS

This application is a continuation application of application Ser. No. 08/626,292, filed on Apr. 1, 1996 now abandoned.

BACKGROUND OF THE INVENTION

1. Field of the Invention

The present invention relates to a sound emitting and/or illuminated toy "ice pop".

2. Description of Related Art

Toys which provide an element of mystery to a child have been commercially successful. One such type of toy was a doll marketed by DSI, Inc. under the trademark ROSIE. ROSIE would speak when an end user(s) held both of the doll's hands. The hands each had an electrode that were coupled to a sound generating device within the doll. By grasping the doll's hands the end user provided a switch that electrically coupled the electrodes. The coupled electrodes closed a circuit within the doll so that the sound generating device produced a sound.

Tiger Electronics and Captoys, Inc. have both marketed sound producing wands under the trademarks BUBBLE BOPPER and MUSICAL BUBBLE TUNES, respectively. The wands each had electrodes that were coupled to a sound generating device. The end user would create a liquid bubble and then try to place the electrodes in contact with the bubble. When in contact with the wand, the liquid bubble would provide a medium that electrically coupled the electrodes so that the sound device generated a sound.

SUMMARY OF THE INVENTION

The present invention is a toy that emits a sound when placed into contact with an end user. The toy includes a handle which has a first electrode and a second electrode. The second electrode is in contact with a frozen liquid that is supported by the handle. The electrodes are coupled to a sound generating device which emits a sound when the first electrode is electrically coupled to the second electrode. To operate the toy, the end user grabs the handle and makes contact with the first electrode. The end user then licks the frozen liquid. The body of the end user electrically couples the first electrode with the second electrode so that the sound generating device emits a sound. The electrodes may be coupled to a light bulb that illuminates the frozen liquid when the end user is in contact with the first electrode and licks the frozen item. Alternatively, the light bulb may be activated by depressing a button on the handle.

BRIEF DESCRIPTION OF THE DRAWINGS

The objects and advantages of the present invention will become more readily apparent to those ordinarily skilled in the art after reviewing the following detailed description and accompanying drawings, wherein.

DETAILED DESCRIPTION OF THE INVENTION

Figure 1:
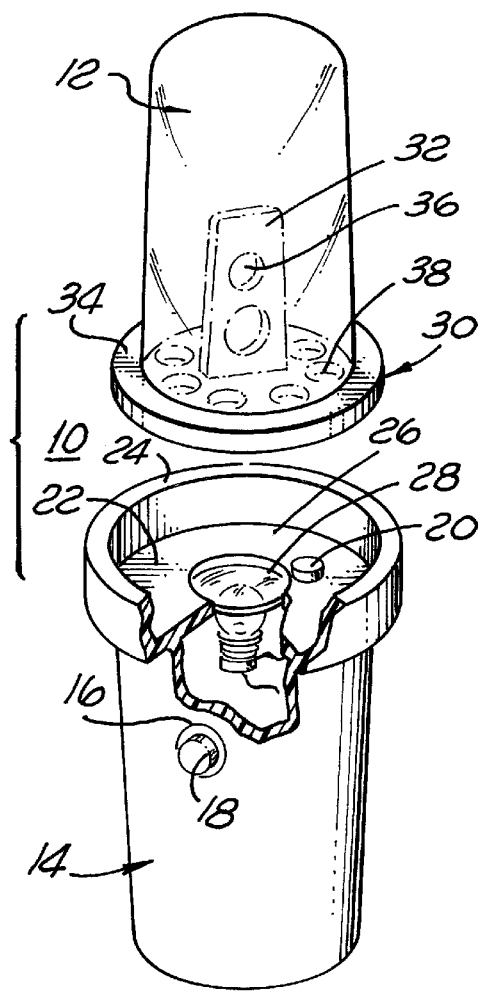
FIG. 1 is a perspective view of a toy device of the present invention.

Referring to the drawings more particularly by reference numbers, FIG. 1 shows a toy device 10 of the present invention. The toy device 10 includes a frozen liquid 12 that is coupled to a handle 14. The device 12 has a first electrode 16 located on an outer surface of the handle 14. The first electrode 16 is preferably concentric with a button 18 that can be depressed by the end user. The device 12 also contains a second electrode 20 that is located within a cavity 22 that is defined by an annular lip 24 of the handle 14. Mounted to a base 26 of the cavity 22 is a light bulb 28. The handle 14 is typically constructed from a low cost molded plastic material. The electrodes 16 and 20 are typically constructed from an electrically conductive material such as copper.

The frozen liquid 12 is preferably a flavored water based substance that canbe licked and consumed by an end user. The frozen liquid 12 is supported by a substrate 30. The substrate 30 includes a tab 32 that extends from a base plate 34. The tab 32 preferably contains holes 36 that increase the adhesion of the frozen liquid 12 to the substrate during the formation of the frozen element 12. The base plate 34 has a plurality of holes 38 that allow the second electrode 20 to come into contact with the frozen liquid 12 when the substrate 30 is inserted into the cavity 22.

Figure 2:
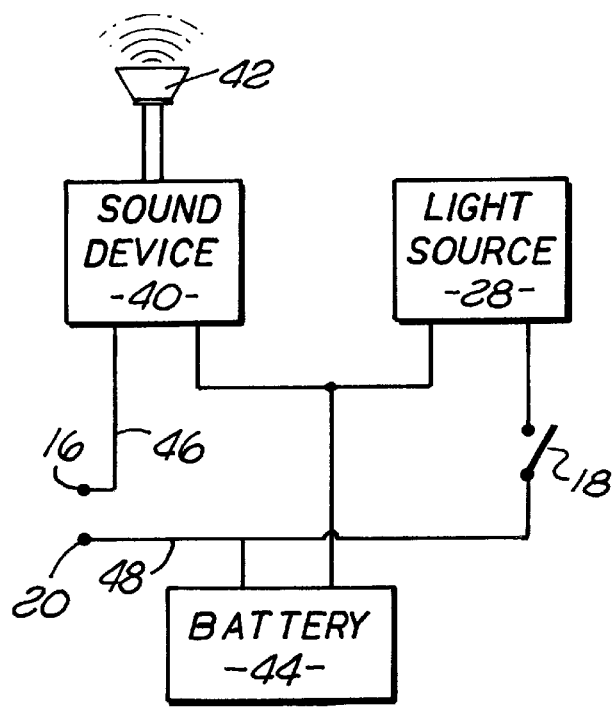
FIG. 2 is a schematic of a circuit of the toy device.

FIG. 2 shows a schematic of the electrical system of the toy device 10. The handle 14 contains a sound generating device 40 and a speaker 42 that can generate and emit sounds from the device 10. The sound generating device 40 can be a sound generating integrated circuit(s) mounted to a printed circuit board as is known in the art. The device 40 can generate a series of different sounds to increase the complexity of the toy 10. For example, the device 40 may generate a "whoop" sound, followed by a "quack" sound. The device 10 also contains a battery 44 that powers the sound generating device 40 and the speaker 42. The battery 44 is typically a 1.5 or 3 volt device that can be installed by removing a cover (not shown) located at the bottom of the handle 14.

The first electrode 16 is connected to the sound device 40 by line 46. The battery 44 is connected to the second electrode 20 by line 48. The sound generating device 40 receives power and generates sound when the first electrode 16 is electrically coupled to the second electrode 20. The light bulb 28 is coupled to the battery 44 by the button 18. The light bulb 28 emits a beam of light into the frozen liquid 12 when the button 18 is depressed and the circuit is closed to connect the battery 44 to the bulb 28.

Figure 3:
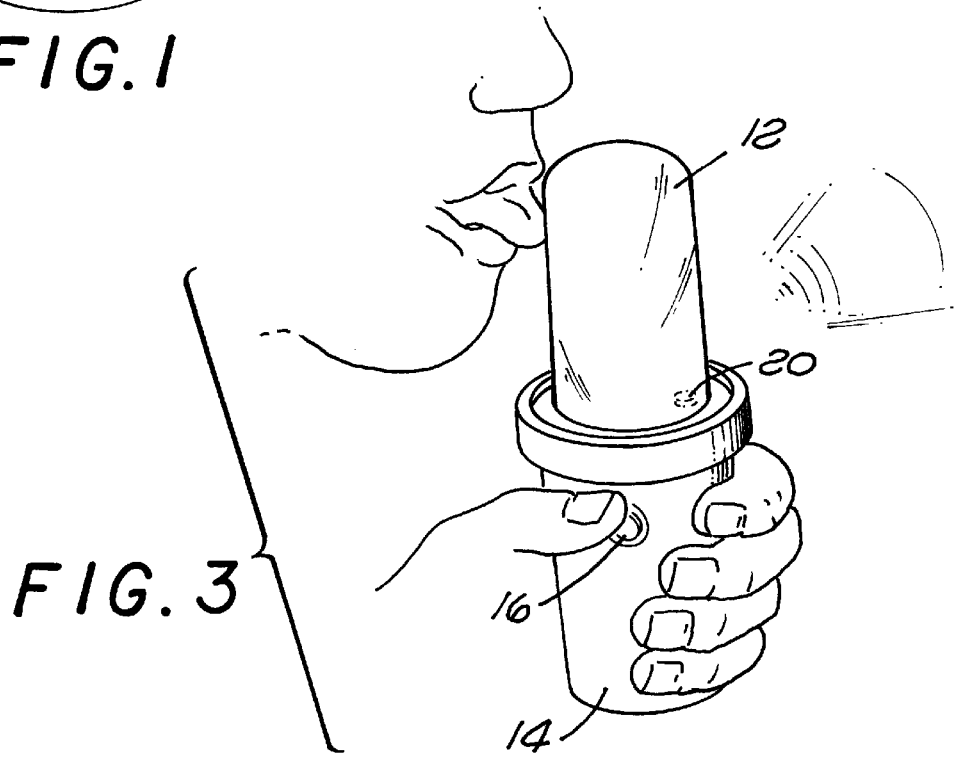
FIG. 3 is a perspective view showing an end user operating the toy device.

As shown in FIG. 3, the toy device 10 is operated by an end user who grabs the handle 14 and licks the frozen liquid 12. The hand of the end user is in contact with the first electrode 16. The tongue of the end user is electrically coupled to the second electrode 20 by the frozen liquid 12. The end user and frozen liquid 12 electrically couple the first electrode 16 to the second electrode 20 so that the sound generating device 40 and speaker 42 emit a sound(s). The toy device 10 will emit a sound each time the end user licks the frozen liquid 12, thereby providing an element of surprise and mystery in using the toy. The end user can also depress the button 18 to illuminate the frozen liquid while licking the device 10.

Figure 4:
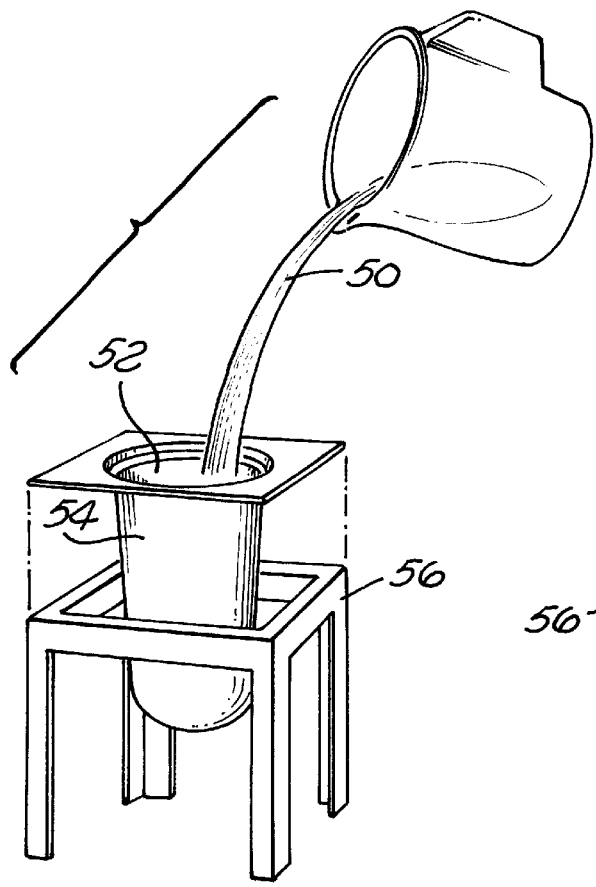
FIG. 4 is a perspective view showing a liquid being poured into a mold.
Figure 5:
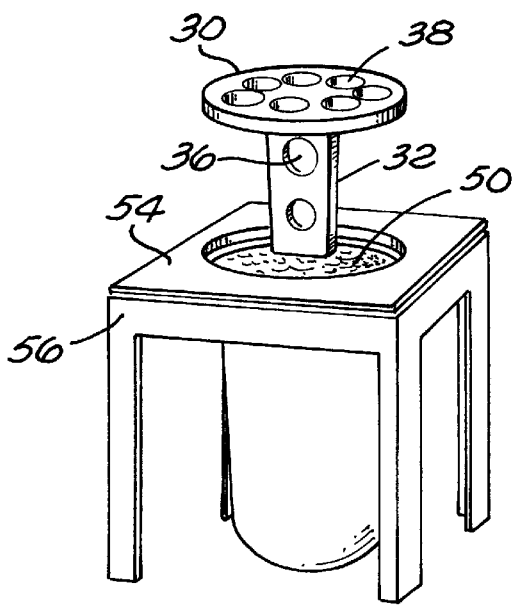
FIG. 5 is a perspective view showing a substrate being inserted into the mold.

FIGS. 4 and 5 show a preferred method of forming the frozen liquid 12. The liquid substance 50 is poured into an inner cavity 52 of a mold 54. The mold 54 is supported by a stand 56. The mold 54 is preferably constructed from a flexible resilient material which can be readily detached from the frozen liquid after formation, and used for the creation of another frozen element. The substrate 30 is inserted into the inner cavity 52 while the substance 50 is in the liquid state. The mold 54, liquid 50 and substrate 30 are then placed in a refrigeration unit to change the phase of the substance to a solid state. The mold 54 and frozen liquid 12 are lifted from the stand 56 and the mold 54 is then peeled away from the frozen item 12. The substrate 30 can then be snapped into the handle 14 to assembly the toy device 10.

Figure 6:
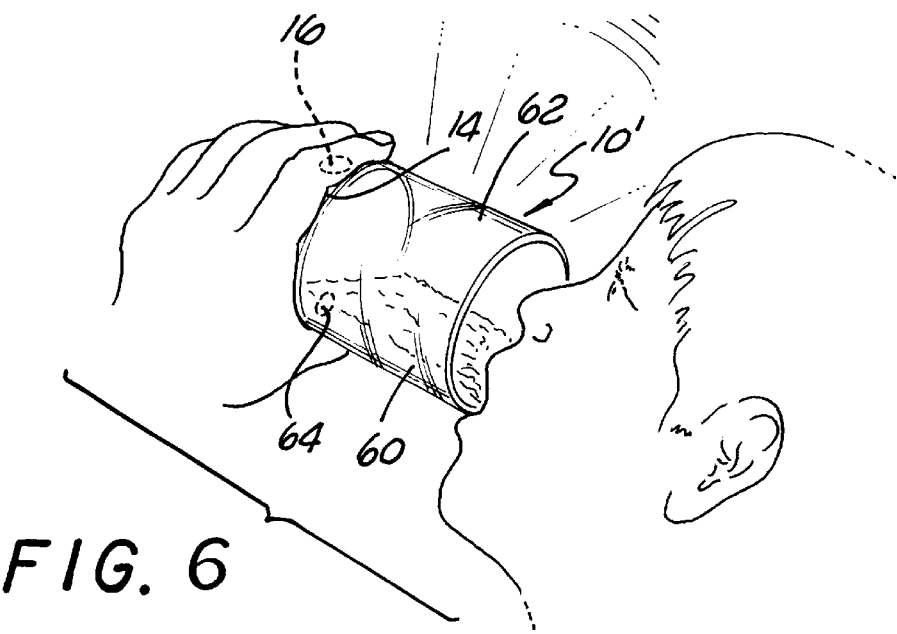
FIG. 6 is a perspective view showing an alternate embodiment of the toy device.

FIG. 6 shows an alternate embodiment of the toy device 10' which utilizes a liquid 60 and the end user to couple the first 16 and second 20 electrodes of the handle 14. The liquid 60 is located within a cup 62 which has a contact 64 that is in contact with the second electrode 20. The cup 62 is preferably constructed from a transparent material so that the liquid can be illuminated by the light bulb 28. When the end user drinks the liquid, the user and liquid create an electrical path between the electrodes 16 and 20, so that the sound generating device 40 and speaker 42 emit a sound.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art. By way of example, the circuit can be varied so that the toy illuminates the frozen liquid when the end user licks the frozen item. As a further alternate embodiment, the toy can both illuminate the frozen liquid and emit a sound when the end user licks the frozen item. Additionally the toy device may be constructed without the electrodes, wherein the device illuminates the frozen item by depressing the button 18, and/or emits a sound when the button 18 is depressed.

What is claimed is:

1. A method for emitting a sound from a toy that supports a frozen liquid as said frozen liquid is licked by the end user, comprising the steps of:

a) providing a toy that includes, a handle which has a first electrode and a second electrode, a sound generating assembly that is attached to said first electrode and said second electrode, said sound generating assembly emits a sound when said first electrode is electrically coupled to said second electrode;

b) attaching the frozen liquid to said handle so that the frozen liquid is electrically coupled to said second electrode;

c) grasping said handle with an appendage of the end user; and, d) consuming the frozen liquid by the end user, wherein the frozen liquid and by an appendage of the end user electrically couple said first electrode to said second electrode so that said sound generating assembly emits a sound.

2. The method as recited in claim 1, wherein the consumable substance is a frozen liquid and further comprising filling a mold with a liquid, placing a substrate within said mold, freezing the liquid, removing said substrate and the frozen liquid from said mold and attaching said substrate and the frozen liquid to said handle so that the frozen liquid is electrically coupled to said second electrode.

3. The method as recited in claim 1, further comprising directing a beam of light into the frozen liquid.

\* \* \* \* \*